(12) United States Patent
Hamery et al.

(10) Patent No.: US 6,339,933 B2
(45) Date of Patent: Jan. 22, 2002

(54) DEVICE FOR AIR CONDITIONING A MOTOR-VEHICLE PASSENGER COMPARTMENT, WITH IMPROVED VENTILATION CONTROL

(75) Inventors: Bruno Hamery, Paris; Jin Ming Liu, Conflans S/Honorine, both of (FR)

(73) Assignee: Valeo Climatisation, La Verriere (FR)

( * ) Notice: Subject to any disclaimer, the term of this patent is extended or adjusted under 35 U.S.C. 154(b) by 0 days.

(21) Appl. No.: 09/739,301

(22) Filed: Dec. 19, 2000

(30) Foreign Application Priority Data

Dec. 20, 1999 (FR) .............................. 99 16081

(51) Int. Cl.⁷ .............................. F25B 39/04; B60H 1/32
(52) U.S. Cl. .............................. 62/133; 62/184
(58) Field of Search .......................... 62/133, 181, 183, 62/184

(56) References Cited

U.S. PATENT DOCUMENTS

| | | | |
|---|---|---|---|
| 4,425,766 A | | 1/1984 | Claypole ..................... 62/133 |
| 4,469,053 A | | 9/1984 | Sakurai ..................... 123/41.12 |
| 5,285,650 A | * | 2/1994 | Lin .............................. 62/133 |
| 5,307,644 A | * | 5/1994 | Cummins et al. ......... 62/183 X |
| 5,623,835 A | * | 4/1997 | Layman et al. ........... 62/184 X |
| 6,073,457 A | * | 6/2000 | Kampf et al. ................. 62/179 |

FOREIGN PATENT DOCUMENTS

| | | |
|---|---|---|
| DE | 19713197 | 10/1998 |
| DE | 19743828 | 4/1999 |
| EP | 0444537 | 9/1991 |

* cited by examiner

Primary Examiner—Harry B. Tanner
(74) Attorney, Agent, or Firm—Liniak, Berenato, Longacre & White

(57) ABSTRACT

In a device for air conditioning a motor-vehicle passenger compartment, a control module adjusts electrical power supplied to a motor-driven fan unit delivering airflow to a condenser of the device. Means are furthermore provided for recording an air throughput passing over the condenser and produced, at least in part, by the motor-driven fan unit. A regulation module estimates a maximum value of the electrical power supply to the motor-driven fan unit, for a given air throughput, with a view to limiting the electrical power supply to this maximum value, as a function of the air throughput.

11 Claims, 2 Drawing Sheets

DEVICE FOR AIR CONDITIONING A MOTOR-VEHICLE PASSENGER COMPARTMENT, WITH IMPROVED VENTILATION CONTROL

FIELD OF THE INVENTION

The invention relates to a device for air conditioning a motor-vehicle passenger compartment.

BACKGROUND OF THE INVENTION

A device of this type, in the usual way, includes an air-conditioning loop equipped with an evaporator, with a compressor, with a condenser and with a pressure-reducing valve, which are traversed by a refrigerant fluid. A motor-driven fan unit is generally able to produce airflow for cooling the engine of the vehicle. This airflow additionally passes over the condenser in order to cool it.

In practice, the motor-driven fan unit is powered electrically via a control module in order to vary its speed and hence the airflow passing over the condenser.

The cooling power of the air-conditioning loop can thus be defined, on the one hand, by the offset between a high pressure of the refrigerant fluid at the outlet from the compressor and a low pressure of the fluid at the inlet to the compressor and, on the other hand, by the quantity of air which passes over the condenser.

A passenger in the passenger compartment, via a control element, generally sets a selected value relating to a cooling power desired in the passenger compartment. Typically, if an increase in this cooling power is wanted, there ensues an increase in the offset between the high and low pressures mentioned above and an increase in the speed of the motor-driven fan unit.

However, if the condenser is sufficiently well ventilated, especially due to a high speed of the vehicle or by a wind incident on the vehicle, it is not necessary to trigger or to increase the speed of the motor-driven fan unit.

However, in the known air-conditioning devices of the abovementioned type, a demand for an increase in the cooling power of the loop systematically entails an increase, at least in steps, of the speed of the motor-driven fan unit and of its electrical power supply. This gives rise, especially when the vehicle is driving at high speed, to an unnecessary triggering or to an inadvertent increase in the speed of the motor-driven fan unit, which entails more rapid wear on it and wastage of the electrical power supply.

The present invention aims to improve the situation.

SUMMARY OF THE INVENTION

To that end the invention proposes an air-conditioning device of the type described above, wherein means are provided for recording a parameter representative of an air throughput passing over the condenser, this air throughput comprising or not comprising an air throughput produced by the motor-driven fan unit.

According to the present invention there is provided a device for air conditioning a motor-vehicle passenger compartment, comprising an air-conditioning loop traversed by a refrigerant fluid, a compressor and a condenser, the condenser being intended to be traversed by an airflow which is produced, at least in part, by a motor-driven fan unit powered electrically via a control module, and further including: means for recording a parameter representative of an air throughput passing over the condenser, the said air throughput comprising or not comprising the air throughput produced by the motor-driven fan unit, and a regulation module, suitable for interacting with the said means and capable of estimating a maximum value for the electrical power supply to the motor-driven fan unit, for a given air throughput and for a given cooling power of the air-conditioning loop, which corresponds to a predetermined, high-pressure value of the refrigerant fluid at the outlet from the compressor, wherein the regulation module is configured to co-operate with the control module in order to limit the electrical power supply to the motor-driven fan unit substantially to the said maximum value, as a function of the air throughput and of the high-pressure value at the outlet from the compressor.

The device according to the invention comprises a regulation module, able to interact with the abovementioned means and capable, for a given air throughput, of estimating a maximum value for the electrical power supply to the motor-driven fan unit. The regulation module can then cooperate with the control module with a view to limiting the electrical power supply to the motor-driven fan unit substantially to this maximum value, as a function of the air throughput.

Thus the electrical power supply to the motor-driven fan unit is limited to a maximum value which is estimated as a function of the air throughput passing over the condenser. This air may originate, at least in part, from the flow produced by the motor-driven fan unit and/or the speed of the vehicle and/or a wind incident on the vehicle. Hence it is estimated that, depending on the speed of the vehicle and, more precisely, depending on the speed differential between the speed of the vehicle and that of the wind, it is no longer necessary to augment the air throughput passing over the condenser via an increase in the power of the motor-driven fan unit beyond a maximum value, even if an increase in the cooling power of the loop is wanted. In contrast, the value of the high pressure at the outlet from the compressor may still increase in proportion to the desired cooling power.

Nevertheless, for reasons of safety, neither should this high-pressure value go beyond a maximum value fixed by the constructors. Furthermore, the engine of the vehicle remains the priority for the choice of the operation of the motor-driven fan unit. In practice, an engine-temperature sensor is provided, linked to the control module of the motor-driven fan unit so as to trigger it and/or vary its speed. Hence, if the engine requires a triggering or an increase in the speed of the motor-driven fan unit, this triggering or this increase in speed is effective even if the power supply to the unit has reached the maximum value estimated by the module for regulating the air-conditioning device according to the invention.

Advantageously, the regulation module is connected to a vehicle speed sensor, and takes account of the speed of the vehicle in evaluating the maximum value of electrical power supply to the motor-driven fan unit.

In one, further developed, embodiment, the regulation module is connected to an anemometer sensor configured to record an airspeed of air incident on the vehicle, proportional to an air throughput passing over the condenser and not produced by the motor-driven fan unit. The regulation module then takes account of the speed of the vehicle and of a wind incident on the vehicle in order to evaluate the abovementioned maximum value of electrical power supply to the motor-driven fan unit.

According to another advantageous characteristic of the invention, the regulation module is furthermore configured to estimate the maximum value of the electrical power supply to the motor-driven fan unit, for a given cooling power of the air-conditioning loop which corresponds to a predetermined value of high pressure of the refrigerant fluid at the outlet from the compressor.

Means are advantageously provided for recording a parameter representative of a high pressure of the refrigerant fluid at the outlet from the compressor.

Particularly advantageously, the regulation module is capable moreover, for a given air throughput, of evaluating a value of electrical power supply to the motor-driven fan unit, below the abovementioned maximum value, as a function of a reduction in high pressure towards high-pressure values below the predetermined value of the high pressure. The regulation module is then configured to co-operate with the control module with a view to adjusting the electrical power supply to the motor-driven fan unit to a value in keeping with a high-pressure value below the predetermined high-pressure value.

Hence, for a given cooling power, the electrical power supply to the motor-driven fan unit is limited to a maximum value which is estimated as a function of an air throughput incident on the condenser.

The regulation module is preferably configured to evaluate the correspondence between the value of electrical power supply to the motor-driven fan unit and a high-pressure value below the predetermined high-pressure value, according to a chosen model of substantially reciprocal quadratic variation.

In one, more developed, embodiment, the device includes means for recording a parameter representative of a low pressure of the fluid at the inlet to the compressor. The regulation module is then configured to evaluate the correspondence between the power-supply value and the reduction in the high pressure, as a function of this low pressure of the fluid.

The compressor is preferably of the "external control" type and the regulation module is connected to a sensor of the electrical power supply current to the compressor, this electric current being representative of the fluid low pressure at the inlet to the compressor.

In one variant according to which the compressor is of the "internal control" type, the regulation module is connected to a sensor of the temperature of the airflow leaving the evaporator, this temperature being representative of the fluid low pressure at the inlet to the compressor.

BRIEF DESCRIPTION OF THE DRAWINGS

Other characteristics and advantages of the invention will emerge on examining the detailed description below and the attached drawings, in which.

DESCRIPTION OF THE PREFERRED EMBODIMENTS

The drawings contain, in essence, elements of a certain character. They could therefore not only serve to give a better understanding of the description, but also contribute to the definition of the invention, as the case may be.

Figure 1:
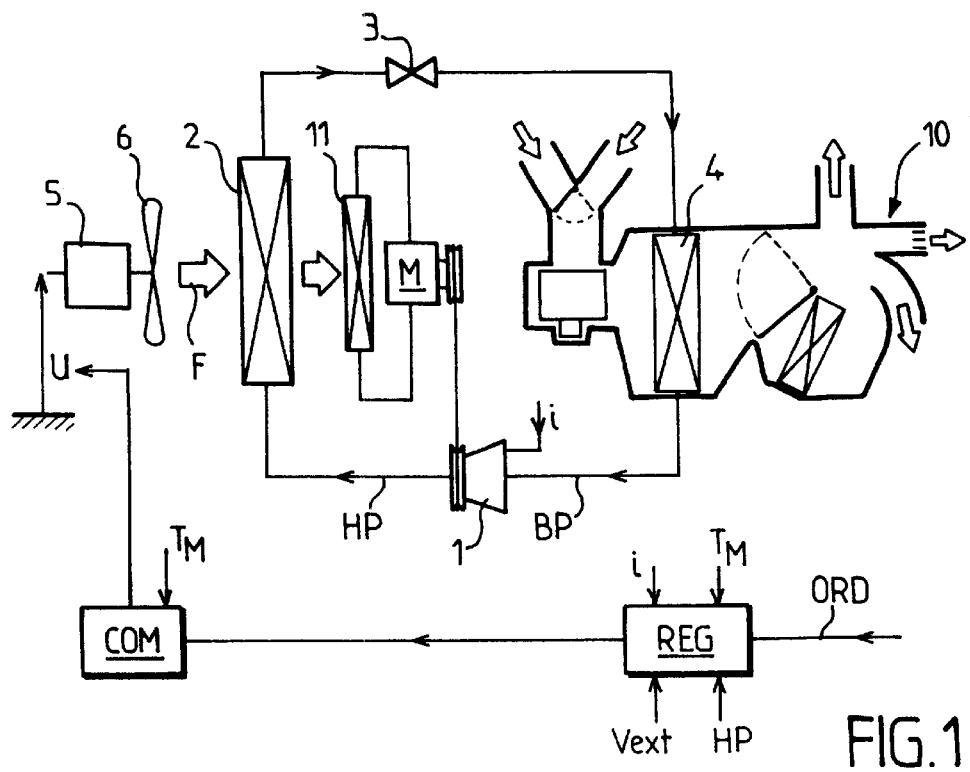
FIG. 1 is a diagrammatic view of the air-conditioning loop of the device according to the invention, the condenser of loop being traversed by an airflow which is produced at least in part by a motor-driven fan unit.

Referring first of all to FIG. 1, an air-conditioning device is described, equipped with a module REG for regulating the speed of a motor-driven fan unit, according to the invention.

The device comprises an air-conditioning loop equipped with a compressor 1, with a condenser 2, with a pressure-reducing valve 3 and with an evaporator 4. This air-conditioning loop is traversed by a refrigerant fluid (FREON or other). At the outlet from the evaporator 4, the fluid is in mainly gaseous form at low pressure BP. In the compressor 1, its pressure increases up to a high-pressure value HP. In passing through the condenser 2, the fluid changes mainly from the gaseous state to the liquid state, at high pressure HP. The fluid, mainly in the liquid state, is then reduced in pressure at 3 to the low pressure BP.

A motor-driven fan unit, supplied with electricity at a voltage U, comprises a motor 5 suitable for driving a fan 6 in rotation. The rotation of the blades of this fan 6 produces an airflow F, passing through a radiator 11 for cooling the engine M of the motor vehicle. This airflow F furthermore passes over the condenser 2. At the inlet to the condenser 2, the refrigerant fluid is mainly in gaseous form, at high pressure HP. In the condenser, it passes from the gaseous state to the liquid state. The condenser gives up its heat to the flow F so as to allow this change of phase of the refrigerant fluid.

In contrast, at the inlet to the evaporator 4, the refrigerant fluid is mainly in liquid form, at low pressure BP. In the evaporator, it changes from the liquid state to the gaseous state. In practice, some air delivered into a heating, ventilation and air conditioning apparatus 10, passing through the evaporator 4, gives up its heat to allow the refrigerant fluid to change to the gaseous state. This air, thus cooled, can then be blown into the passenger compartment of the vehicle (not represented), in order to air condition it.

Figure 2:
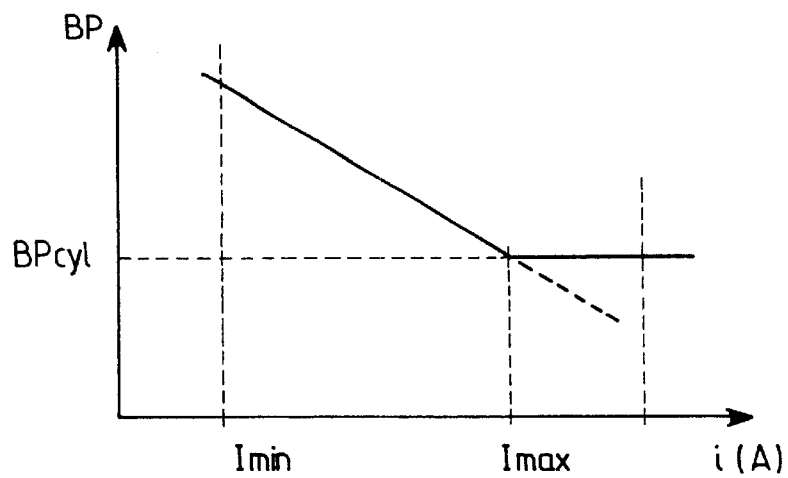
FIG. 2 represents the profile of the low pressure at the inlet to an external-control compressor of a device according to the invention, as a function of an electric current for control of a valve of the compressor.

In the example described, the compressor 1 is of the "external control" type. Thus it includes an electronic valve the functioning of which is controlled from outside by a control current i. Referring to FIG. 2, an increase in the strength of this control current i is represented by a reduction in the low pressure of the refrigerant fluid in the branch of the air conditioning loop delimited by the pressure reducer and the compressor, on the evaporator 4 side. In practice, the control current i varies between two limits Imin and Imax, between which the low pressure BP at the inlet to the compressor 1 reduces down to a value BPcyl, this minimum value of the low pressure corresponding to a maximum displacement reached by the compressor 1.

In practice, the power supply voltage U for the motor 5 of the motor-driven fan unit is adjusted by a control module COM. Thus, this control module is able to receive set-point values and to adjust the value of the power-supply voltage U as a function of these set-point values. A variation in the power-supply voltage U is finally translated into a variation in the speed of the motor-driven fan unit and, that being so, a variation in the air throughput which it produces. In practice, a sensor of the temperature $T_M$ of the engine M is connected to the module COM in order that the motor-driven fan unit is triggered, or else in order to increase its speed, in the event of overheating of the engine. Conversely, when the temperature of the engine $T_M$ falls below a chosen threshold value, the module COM reduces the speed of the motor-driven fan unit or cuts off its operation.

In the air-conditioning device according to the invention, the module COM further receives a set-point value from a regulation module REG. The regulation module REG initially receives a set-point value ORD, typically from a control device available to a passenger in the passenger compartment, relating to a desired cooling power for the air-conditioning loop and corresponding to a desired air-heating configuration for the air-conditioning in the passenger compartment. A module for control of the electric current i (not represented) receives this set-point value ORD and thus adjusts the value of the strength of the control current i of the valve of the compressor. In particular, if an increase in the cooling power of the loop is desired, the strength i of the control current increases and the offset between the low pressure BP and the high pressure HP increases as a consequence.

In the known air-conditioning devices, an increase in the desired cooling power is also translated into a systematic increase, at least in steps, of the speed of the motor-driven fan unit, with a view to increasing the air throughput which it delivers and which passes over the condenser 2 as a result.

In the air-conditioning device according to the invention, the regulation module REG takes account of an external airspeed of air incident on the vehicle. The regulation module therefore adjusts the power-supply voltage U for the motor-driven fan unit, interacting with the control module COM of the motor-driven fan unit. More particularly, the module for regulating the device according to the invention limits the power-supply voltage U for the motor-driven fan unit, as a function of an external airspeed Vext. This external airspeed Vext can be deduced from the speed of the vehicle, but also from a wind incident on the vehicle.

Figure 3:
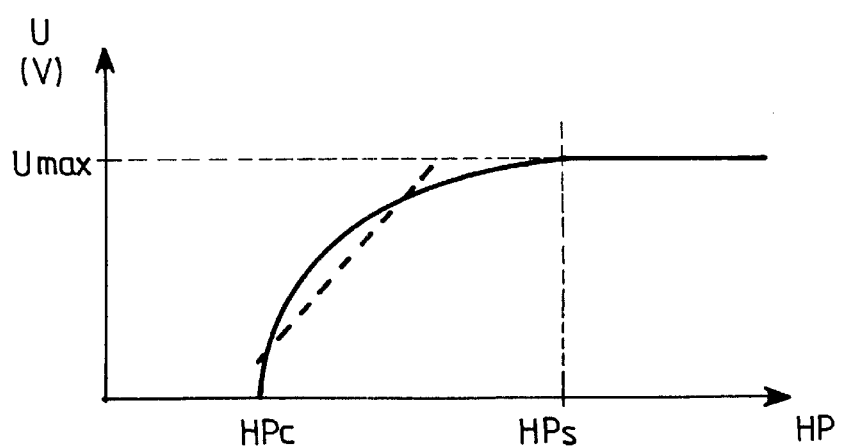
FIG. 3 represents the profile of an electrical power-supply voltage for the motor-driven fan unit as a function of the high pressure at the outlet from the compressor, this voltage being adjusted by the regulation module of the device according to the invention.

The module REG thus estimates a maximum value Umax (FIG. 3) of the power-supply voltage, as a function of this external airspeed Vext, and drives the control module COM so as not to exceed the power-supply voltage Umax.

Figure 4:
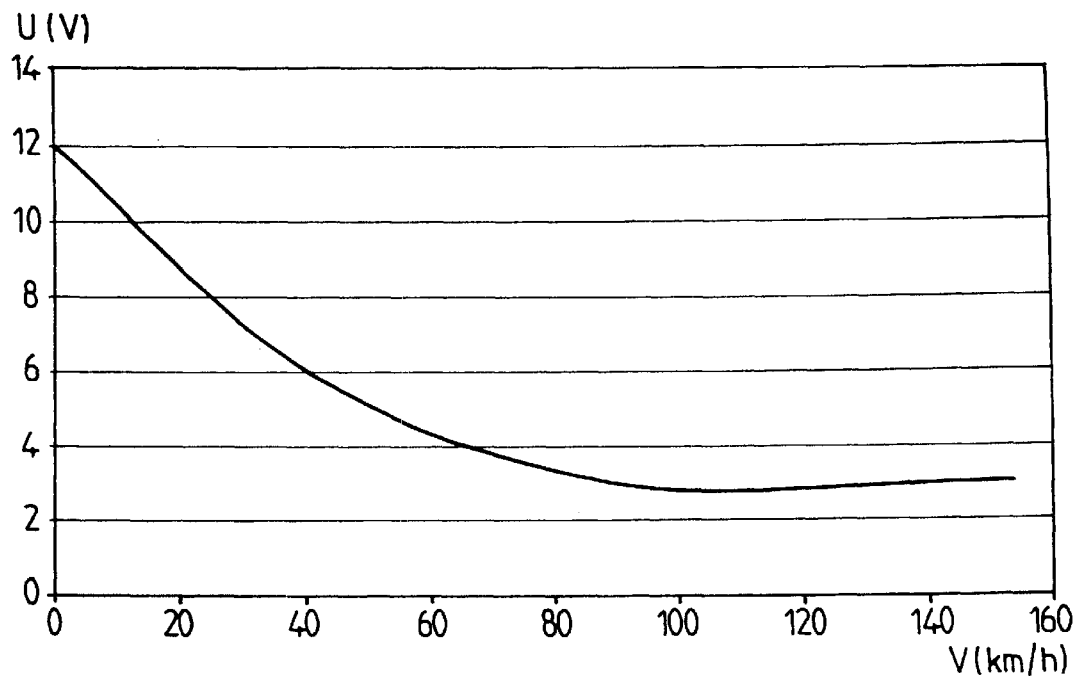
FIG. 4 represents the profile of an optimal power-supply voltage for the motor-driven fan unit, as a function of the speed of the vehicle.

Referring in fact to FIG. 4, it is apparent that, for are given speed (non-zero) of the vehicle, a higher power-supply voltage is pointless. The Applicant has observed that, for a given, substantially constant, cooling power, the power-supply voltage U necessary for the motor-driven fan unit to sustain the abovementioned cooling power decreased as a function of the speed of the vehicle (FIG. 4). Thus the regulation module REG of the device according to the invention estimates an optimum power-supply voltage (maximum), especially as a function of the speed of the vehicle. Typically, for a given cooling power, the power-supply voltage U for the motor-driven fan unit which is necessary to conserve this cooling power changes from 12 volts when the vehicle is idling to a voltage which stabilizes at about 3 volts when the speed of the vehicle exceeds 100 km/h.

In practice, a connection is provided between the regulation module and a sensor of the speed of the motor vehicle (for example the mph indicator on the dashboard, or another one). The module REG thus evaluates a correspondence between the speed of the vehicle and the airspeed which the condenser 2 receives. In one, more developed, embodiment, an anemometer sensor may further be provided in order to measure the speed of the air directed onto the vehicle by an incident wind.

In what follows, it is sought to optimize a coefficient of performance of the air-conditioning loop, denoted COP, for a given cooling power Pf, as a function of the mechanical power of the motor-driven fan unit, denoted P5, and of the mechanical power of the compressor, denoted P1. This performance coefficient can be deduced from the relationship:

$$COP=Pf/(P1+P5)$$

In general, the relationship between the voltage U for the motor-driven fan unit and the strength of an electric current I which flows between its terminals can be expressed by:

$$U=|Z|*I+k,$$

where k is a constant and Z its impedance.

By estimating the efficiency of the alternator of the motor-driven fan unit at a value close to 50%, the power P5 of the motor-driven fan unit is evaluated by:

$$P5=2*U(U-k)/|Z|$$

The power P1 of the compressor can be defined conventionally by:

$$P1=a*\theta+b+b,$$

where $\theta$ represents its compression ratio, a and b being parameters specific to the compressor (relating to its rotational speed, in practice).

The performance coefficient COP is therefore expressed:

$$COP=Pf/(a*\theta+b+2U(U-k)/|Z|)$$

At substantially constant cooling power Pf, it is necessary for the term in the denominator to be a minimum for this coefficient COP to be optimal. The following relationship should therefore be satisfied:

$$dP/d\theta=a+(2*(2U-k)/|Z|)*(dU/d\theta)=0$$

or also: $dU/d\theta=-a/(2*(2U-k)/|Z|)$

The compression ratio $\theta$ is a function of the high pressure HP and of the low pressure BP, such that, in a conventional way:

$$d\theta=dHP*BP$$

Hence, $dHP=[-2*BP*(2U-k)/(|Z|*a)]*dU$

It should be noted that the term dHP/dU represents the variation (increase or decrease) in the high pressure HP as a function of the voltage U. Furthermore, on the basis of a sensor suitable for recording the control current i of the compressor, or more simply from a connection between the module REG and the control module of the compressor, the regulation module deduces the value of the pressure BP (FIG. 2).

Hence the performance coefficient COP is optimal when the ratio in the variations of high pressure HP and of power-supply voltage U are equal, as a first approximation, to:

$$|HP/|U|-(2*BP*(2U-k)/|Z|)/a$$

Figure 5:
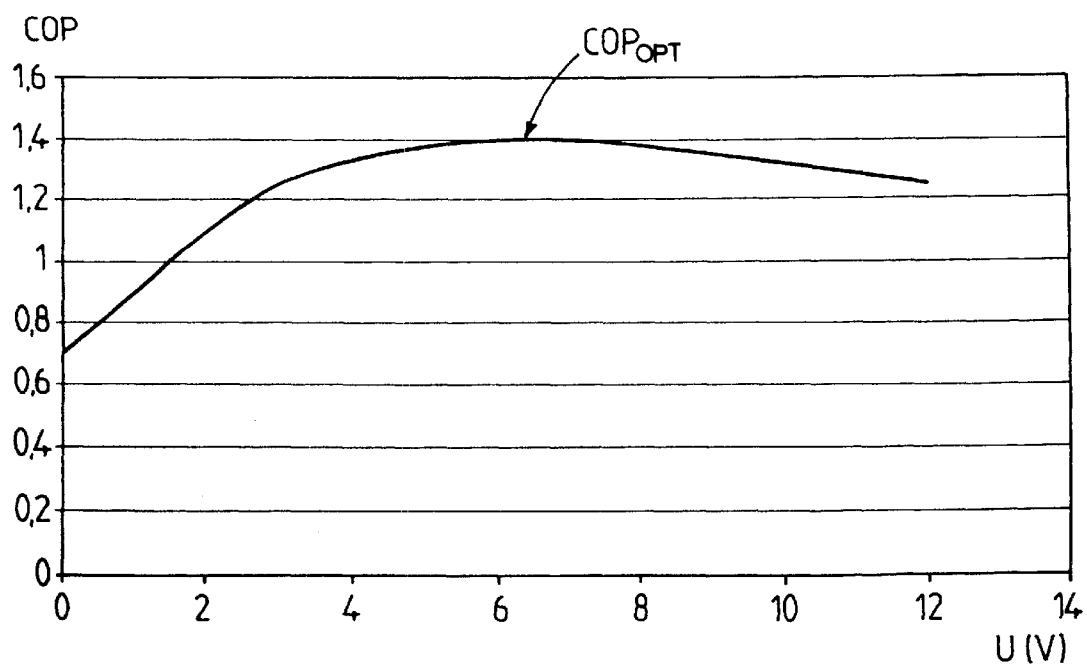
FIG. 5 represents the profile of a coefficient of overall performance of the air-conditioning loop and of the motor-driven fan unit, at substantially constant vehicle speed and cooling power, as a function of the power supply voltage for the motor-driven fan unit.

Referring to FIG. 5, the performance coefficient COP increases, then decreases, as a function of the voltage at the terminals of the motor-driven fan unit. Its optimum value (maximum) COPopt is reached for a chosen value of the power-supply voltage U corresponding to a value of the high pressure HP. However, the value of the voltage U remains below its maximum value Umax which is itself estimated as a function of the outside airspeed Vext, and this independently of the value of the high pressure HP.

In contrast, a reduction in the speed of the motor-driven fan unit remains allowable, in particular if the pressure HP reduces. In what follows, a model is proposed for regulation of the voltage U as a function of the pressure HP.

In order to preserve an optimum performance coefficient COP, the voltage U should satisfy the following relationship as a function of the pressure HP:

$$HP=(U-k*U)*(2*BP)/(|Z|*a)+c$$

The high pressure at the outlet from the compressor, when the latter is at maximum displacement, with a control current i close to the value Imax, is denoted HPc. As regards the control of the compressor in maximum-displacement mode, it is sought to minimize the pressure BP and, more particularly, the pressure HP, as well as its compression ratio. Hence, for a high pressure HP below HPc, the power-supply voltage for the motor-driven fan unit is zero and the constant c above corresponds to the pressure HPc.

The variation (FIG. 3) in the voltage U is then deduced therefrom as a function of the pressure HP, for values of U below Umax:

$$U=\tfrac{1}{2}*[k+(k^2+2*a*(HP-HPc)*|Z|/BP)^{1/2}] \quad (1)$$

The regulation module REG, according to another advantageous characteristic of the invention, is then configured to stabilize the power-supply voltage for the motor-driven fan unit as a function of the pressure HP, for values of voltage U below the value Umax.

However, if the value of the high pressure HP at the outlet from the compressor 1 exceeds a threshold value HPs, the power-supply voltage U remains constant, fixed at the value Umax. In order to record the value of the pressure HP, a pressure sensor is provided at the outlet from the compressor 1, in the cooling loop (condenser side). This sensor is linked to the regulation module REG.

The regulation of the power-supply voltage U for the motor-driven fan unit is carried out as follows:

first of all, the regulation module evaluates a maximum voltage Umax as a function of the outside airspeed Vext;

if the pressure HP is below the pressure HPc, then the module REG sets a zero voltage U;

if the pressure HP is above the pressure HPc, the regulation module evaluates the corresponding value of U according to equation (1):

if this value is greater than or equal to the value Umax, the module REG imposes the voltage Umax;

if this value is below the voltage Umax, then the voltage to be applied to the motor-driven fan unit is that which corresponds, according to equation (1), to the value of the high pressure measured by the abovementioned pressure sensor.

In brief, the regulation module receives information relating to an airspeed of air incident on the vehicle (from a speed sensor or other sensor). From this information, it deduces a maximum power-supply voltage Umax of the motor-driven fan unit (FIG. 4).

Advantageously, in order for the air-conditioning device to operate with an optimum performance coefficient, the module REG regulates the value of the voltage to be applied to the motor-driven fan unit as a function of the high pressure at the outlet from the compressor. The module REG therefore receives information relating to the pressure HP, as well as information relating to the pressure BP (on the basis of the control current i) and deduces therefrom a value of the voltage U. If this value is higher than the maximum value Umax, the voltage to be applied to the motor-driven fan unit is Umax. Otherwise the module (via the control module COM) applies the voltage U corresponding to the high pressure HP measured.

Obviously, the invention is not limited to the embodiment described above by way of example; it extends to other variants.

Thus, it will be understood that the regulation of the voltage U as a function of the high pressure HP, although particularly advantageous, may, in a simplified variant, be dispensed with. In this case, only the regulation as a function of the outside airspeed Vext, deduced at least from the speed of the vehicle, may be provided in order to fix a maximum value Umax of the power-supply voltage.

The use of the value of the control current i (FIG. 2) of the compressor in order to evaluate the low pressure BP is described above by way of example. In a variant according to which the compressor is of the "internal control" type, provision may be made to arrange a sensor of the temperature of the air at the outlet from the evaporator, this temperature being representative of the low pressure BP. In another variant, provision may be made to arrange a pressure sensor directly at the inlet to the compressor.

In one less elaborate variant, provision may be made to fix the value of the low pressure BP at an average value and to effect regulation of the voltage U as a function of the pressure HP, as a function of this average value.

According to equation (1), the module REG of the device according to the invention may, as a variant from regulation in terms of voltage U, effect regulation of the strength I (substantially linear variation represented in FIG. 3) or of the power P5 of the motor-driven fan unit, as a function of the high pressure HP.

The control and regulation modules COM and REG may, in one practical embodiment of the invention, be grouped together into a single control element, for example in a common electronics box.

Obviously, the various numerical values which appear especially in FIGS. 4 and 5 are given here by way of example, for particular air-conditioning loops and motor-driven fan units.

What is claimed is:

1. A device for air conditioning a motor-vehicle passenger compartment, comprising an air-conditioning loop traversed by a refrigerant fluid, a compressor and a condenser, the condenser being intended to be traversed by an airflow which is produced, at least in part, by a motor-driven fan unit powered electrically via a control module, and further including: means for recording a parameter representative of an air throughput passing over the condenser, the said air throughput comprising or not comprising the air throughput produced by the motor-driven fan unit, and a regulation module, suitable for interacting with the said means and capable of estimating a maximum value for the electrical power supply to the motor-driven fan unit, for a given air throughput and for a given cooling power of the air-conditioning loop, which corresponds to a predetermined, high-pressure value of the refrigerant fluid at the outlet from the compressor, wherein the regulation module is configured to co-operate with the control module in order to limit the electrical power supply to the motor-driven fan unit substantially to the said maximum value, as a function of the air throughput and of the high-pressure value at the outlet from the compressor.

2. The device of claim 1, wherein the regulation module is suitable for being linked to a vehicle speed sensor, and the regulation module is able to take account of the speed of the vehicle in order to evaluate the said maximum value of electrical power supply to the motor-driven fan unit.

3. The device of claim 1, wherein the regulation module is suitable for being linked to an anemometer sensor configured to record an airspeed of air incident on the vehicle, proportional to the air throughput passing over the condenser and not produced by the motor-driven fan unit, and wherein the regulation module is able to take account of a wind incident on the vehicle and/or of the speed of the vehicle in order to evaluate the said maximum value of electrical power supply to the motor-driven fan unit.

4. The device of claim 1, including means for recording a parameter representative of a high pressure of the refrigerant fluid at the outlet from the compressor.

5. The device of claim 4, including a pressure sensor at the outlet from the compressor in order to record the high pressure of the fluid.

6. The device of claim 4, wherein the regulation module is capable, moreover, for a given air throughput, of evaluating a value of electrical power supply to the motor-driven fan unit, below the said maximum value, as a function of a reduction in high pressure towards high-pressure values below the said predetermined value, and wherein the regulation module is configured to co-operate with the control module with a view to adjusting the electrical power supply to the motor-driven fan unit to a value in keeping with a high-pressure value below the said predetermined value.

7. The device of claim 6, wherein the regulation module is configured to evaluate the correspondence between the value of the electrical power supply to the motor-driven fan unit and a high-pressure value below the said predetermined value, according to a chosen model of substantially reciprocal quadratic variation.

8. The device of claim 6, including means for recording a parameter representative of a low pressure of the fluid at the inlet to the compressor, and in that the regulation module is configured, moreover, to evaluate the correspondence between the power-supply value and the reduction in the high pressure, as a function of the said low pressure of the fluid.

9. The device of claim 8, wherein the compressor is of the external-control type and wherein the regulation module is suitable for being linked to a sensor of the electrical power supply current to the compressor, the said electric current being representative of the fluid low pressure at the inlet to the compressor.

10. The device of claim 9, wherein the compressor is of the internal-control type and wherein the regulation module is suitable for being linked to a sensor of the temperature of the airflow at the outlet from the evaporator, this temperature being representative of the fluid low pressure at the inlet to the compressor.

11. The device of claim 1, wherein the motor-driven fan unit is powered electrically with a voltage, and wherein that the regulation module is configured to evaluate a maximum power-supply voltage for the motor-driven fan unit as a function of the said air throughput.

* * * * *